United States Patent [19]

Chung

[11] Patent Number: 5,548,056
[45] Date of Patent: Aug. 20, 1996

[54] POLYUREAURETHANE PRIMERLESS ADHESIVE

[75] Inventor: Daniel A. Chung, Dublin, Ohio

[73] Assignee: Ashland Inc., Russell, Ky.

[21] Appl. No.: 332,625

[22] Filed: Oct. 31, 1994

Related U.S. Application Data

[63] Continuation of Ser. No. 130,670, Oct. 1, 1993, abandoned, which is a continuation of Ser. No. 849,850, Mar. 12, 1992, abandoned.

[51] Int. Cl.$^6$ ................................................. C08G 18/10
[52] U.S. Cl. ........................... 528/61; 528/62; 528/905; 156/307.1; 428/423.7
[58] Field of Search ................................. 528/58, 61, 62, 528/905; 156/307.1; 428/423.7

[56] References Cited

U.S. PATENT DOCUMENTS

| | | | |
|---|---|---|---|
| 4,444,976 | 4/1984 | Rabito | 528/60 |
| 4,743,672 | 5/1988 | Goel | 528/44 |
| 4,812,524 | 3/1989 | Baghdachi | 525/236 |
| 4,923,756 | 5/1990 | Chung | 428/480 |
| 5,002,806 | 3/1991 | Chung | 427/385.5 |

*Primary Examiner*—Rachel Johnson
*Attorney, Agent, or Firm*—Mary E. Picken

[57] ABSTRACT

This invention is a method of making a laminated untreated fiberglass reinforced polyester substrates and a cured polyureaurethane adhesive composition. The prepolymer component of the adhesive is the reaction product of a slowly reacting polyisocyanate and a polyol.

1 Claim, No Drawings

POLYUREAURETHANE PRIMERLESS ADHESIVE

This is a continuation of copending application Ser. No. 08/130,670 filed on Oct. 1, 1993, now abandoned, which is a continuation of copending application Ser. No. 07/849,850 filed on Mar. 12, 1992, now abandoned.

BACKGROUND OF THE INVENTION

This invention relates to a prepolymer and a curative which together form a polyurethane structural adhesive for bonding fiberglass reinforced polyester ("FRP") and metal parts without using a primer pretreatment. These parts are used in the manufacture of transportation vehicles such as cars, trucks and boats.

Polyurethane structural adhesives have been in use for many years and have certain characteristics which make them difficult to use as widely as they might be used. For example, they are sensitive to the degree of moisture in the FRP substrates and may form weaker bonds when the substrates are damp. After the adhesive is applied to the substrate there is often too brief a time period within which the adhesive is still fluid and the second substrate can be adhered. This time period is known as the "open time" and it would be commercially useful to have adhesives whose "open times" could be varied according to the needs of the vehicle manufacturers' assembly lines.

Often the adhesive must be applied to a substrate in a vertical position on which, if the adhesive is too fluid, it will drip or sag before the second substrate can be placed over the adhesive. Thus, an adhesive which does not sag is preferred. This property is known as "non-sag" and is measured by noting the distance the adhesive has flowed at the end of a period of time such as three minutes. The test method used to measure sag is ASTM D2202-84.

Commercial polyurethane adhesives presently used in industry show a very slow rate of early strength development ("green strength"). It would be desirable if an adhesive having faster green strength could be found.

During the manufacturing process certain assembled part laminates are prepared towards the end of the Friday shift and left idle until next Monday. The long delay before heat curing or baking of the assembled parts on Monday morning can result in sacrifice of the performance of certain adhesives. A new adhesive which can tolerate a delayed postbake would be welcomed in the assembly line. Even better would be an adhesive curable at ambient or room temperature and not requiring any heating to form strong bonds. Usually polyurethane adhesives require baking at 121° C. or above for about 30 to 60 minutes in order to be strong enough that, when tested, the substrate itself breaks ("delamination"). When a structural adhesive is said to exhibit 100% substrate delamination, inspection of the broken interface between adhesive and substrate displays only the torn fibers and disrupted surface of the FRP substrate itself throughout the entire area of the interface.

Whether or not adhesives require baking to form strong bonds, the bonds formed must withstand high temperatures during subsequent steps in the manufacturing process. For that reason the laminates made with the adhesive of this invention are tested at 82° C. to learn whether they are so tough that the mode of failure is substrate delamination.

Adhesives have been used for many years in industry to adhere plastic materials. One of the drawbacks has been the problem of shrinkage of the plastic surface at the site of application of the adhesive resulting in deformation of the plastic surface and formation of a shallow dimple or ripple in the otherwise smooth outer surface of the plastic. Since we all expect our automobiles, boats and planes to have sleek smooth exterior surfaces ("Class A") such defects are extremely undesirable. This phenomenon of dimpling or rippling at the site of adhesive application is known in the automobile industry as "bond line read through" and has escaped solution. It would be a great improvement if such dimpling, rippling or surface deformation could be eliminated.

As the production of cars and trucks becomes more sophisticated and more automated, new adhesives must be developed which will
adhere to moist substrates,
display variable "open time",
have "non-sag" properties,
have fast "green strength",
tolerate "delayed postbake",
cure at ambient temperature and delaminate the substrate in failure, and form bonds withstanding 82° C. exposure, all without deforming the smooth outer surface of the FRP substrate.

OBJECT OF THE INVENTION

It is therefore an object of this invention to provide a primerless polyureaurethane structural adhesive which will, when used on FRP substrates, provide adequate open time, non-sag properties, good early green strength, no bondline read-through defects and excellent adhesion strength whether immediately postbaked or delaying the postbaking at temperatures lower than 177° C. or when not postbaked at all.

BROAD STATEMENT OF THE INVENTION

The present invention is a polyureaurethane primerless structural adhesive made by combining a prepolymer having excess isocyanate groups with a curative comprising diamines and, optionally, polyol. This polyureaurethane adhesive demonstrates excellent non-sag behavior and long open time. When cured at ambient temperature the adhesive delaminates the FRP substrate in a test such as the lap shear test at 22° C. or 82° C. [ASTM method D1002]. Whether cured at or above 93° C. for 60 minutes or cured at ambient temperatures (no post-baking at all) lap shear strengths of over 250 psi at 82° C. are demonstrated.

Unlike the previously developed polyurethane adhesives in which as much as two-thirds of the curative functionality has been hydroxyl, it has surprisingly been found that increasing the curative amine functionality while simultaneously using slowly reacting isocyanates in the prepolymer, provides a polyureaurethane adhesive displaying all the heretofore desired but unattained characteristics. Further adjustment of the proportions of amine and hydroxyl curative equivalents permits the user to vary open time (use more hydroxyl to decrease reactivity and increase open time) and other characteristics.

This invention is also a method of making a two component polyureaurethane primerless structural adhesive curable at ambient temperatures comprising the steps of: (1) reacting a polyol with an excess of polyisocyanate to prepare a prepolymer, and (2) adding a curative component prepared by combining 0.33 to 1.00 equivalents diamine and 0 to 0.67 equivalents polyol per equivalent of curative.

The polyureaurethane adhesive of this invention is particularly well adapted for use on fiberglass reinforced polyester substrates. These substrates are made from, typically, the reaction product of dipropylene glycol, maleic anhydride, high molecular weight polyvinyl acetate, styrene, peroxide polymerization initiator and fillers. The adhesive is adaptable for use on a variety of other plastics such as reaction injection molding (RIM) polyurethanes, acrylonitrile-butadiene-styrene (ABS) terpolymers, styrene acrylonitrile copolymers (SAN), thermoplastic polyolefins (TPO) and thermoplastic alloys such as polycarbonate-polyester blends and polycarbonate-ABS blends. Among the useful fibers used in reinforcing the substrates are fiberglass, graphite and Kevlar polyamide fiber. Steel substrates may also be adhered using the polyureaurethane adhesive of this invention.

Among the fiberglass reinforced polyester substrates useful in the practice of this invention are those provided by GenCorp, Marion, Ind. (GC-7113, GC-7098 and GC-7101 substrates), Rockwell International Corporation, Centralia, Ill. (RW 9468 substrate), Budd Company, Madison Heights, Mich. (DSM 950 substrate), Eagle Picher Plastics, Grabill, Ind. (EP SLI223-1 and 218-8 substrates), Premix, North Kingsville, Ohio (A-7 substrate) and Commercial Composite, Chicago, Illinois (8049 substrate).

The polyureaurethane adhesive of this invention is made by combining an isocyanate terminated prepolymer with a curative. The prepolymer is the reaction product of an aromatic polyisocyanate and a polyol. The aromatic polyisocyanate component must be one which reacts slowly with the diamine of the curative. Among such slowly reacting isocyanates are those commercial products which contain major proportions of monomers and minor proportions of oligomers. Such oligomers have higher molecular weights than do the monomers. Among the slowly reacting polyisocyanates useful in this invention are:

polymerized diphenylmethane diisocyanate having 80 to 99 parts
monomers, 1 to 20 parts uretonimine oligomer and 0 to 15 parts higher molecular weight oligomers,
2,6-toluene diisocyanate or polymerized 2,6-toluene diisocyanate,
3,3'-dimethyl-4,4'-diisocyanatobiphenyl or polymerized 3,3'dimethyl-4,4'-diisocyanatobiphenyl, or
3,3'dimethyl-4,4'-diisocyanato diphenyl methane or polymerized
3,3'dimethyl-4,4'-diisocyanato diphenyl methane The most preferred isocyanate in the practice of this invention is polymeric diphenylmethane diisocyanate having no more than 20 parts oligomer available from ICI, Sterling Heights, Mich. as PBA-2310-1 isocyanate, from Mobay, Pittsburgh, Pa. as Mondur CD or from Dow Chemical, Midland, Mich. as Isonate 143 L isocyanate. The polymerized diphenyl methane diisocyanate used in this polyureaurethane adhesive prepolymer comprises a mixture of 80 to 99 parts monomers and 1 to 20 parts uretonimine oligomer and 0 to 15 parts higher molecular weight oligomers.

The polyol used in the prepolymer component of the adhesive may be 700 to 4,000 molecular weight polypropylene oxide ether diol, polyethylene oxide polypropylene oxide ether diol, polytetramethylene ether glycol, polythioether diol, polyester diol, polyepsilon caprolactone diol, polycarbonate diol, polybutadiene diol or mixtures of these diols. The preferred polyol is a polypropylene oxide ether diol of 2000 molecular weight available from Olin Chemicals, New Haven, Conn. as Poly G 20–56 polyol.

When the prepolymer is made, as described, by combining the polyol and the polymerized diphenyl methane diisocyanate having less than 20% uretonimine oligomer content and less than 15% higher molecular weight oligomers, as much as 100% equivalent polyamine can be used in the curative without having unmanageably short open times. If a second polyisocyanate containing more oligomer than 20% is to be used to make the prepolymer, it must be added after the polyol-isocyanate (<20% oligomer) reaction. Combining the two polyisocyanates before reacting with polyol, or letting the >20% oligomer containing isocyanate react with polyol first and then adding the <20% oligomer—containing isocyanate does not permit the use of 100% diamine in the curative without causing bondability of the polyureaurethane adhesive to become unmanageably brief. One example of such a polymerized diphenyl methane diisocyanate containing more than 20% oligomer is Mondur MRS polymerized diphenyl methane diisocyanate from Dow Chemical.

Optional ingredients in the prepolymer component of the adhesive of this invention include fillers. Representative examples of inert powdery fillers are: aluminum silicates, carbon black, talcs (magnesium silicates), calcium carbonate, calcium silicates, barium sulfates, graphite, or mixtures of fillers. The preferred filler ingredient is talc.

Additional optional ingredients in the prepolymer component include catalysts such as zinc stearate and antioxidants such as Irganox 1010 antioxidant available from Ciba Geigy Corporation, Ardsley, N.Y.

The curative used in the polyureaurethane adhesive of this invention comprises a diamine, and, optionally, a polyol, as well as optional catalyst, and optional thickening agent.

Among the numerous diamines useful in the curative of this invention are the following aromatic and aliphatic diamines:
toluene diamine
1-methyl-3,5-diethyl-2,4-diaminobenzene
1-methyl-3,5-diethyl-2,6 diaminobenzene (also known as DETDA or diethyl toluene diamine)
di(methylthio) toluene diamine
1,3,5-triethyl- 2,6-diaminobenzene
toluene diamine derivatives containing halogen groups, cyano groups, alkoxy,
alkylthio, alkenyl or carbonylic moieties
m-phenylene diamine
p-phenylene diamine
4'4 '-methylenedianiline
4,4'-diaminodiphenyl sulfone
2,6-diamino-pyridine
4,4'-methylene bis (3-chloroaniline)
4,4'-methylene bis(3-chloro-2,6-diethylaniline)
4,4'-methylene bis (3-chloro-2,5-diethylaniline)
3,3'-di-isopropyl-4,4'-diaminodiphenylmethane
3,5,3', 5'-tetraethyl-4,4'-diaminodiphenylmethane
propylene-di-4-aminobenzoate
isobutyl 4-chloro-3,5-diaminobenzoate
bis (2-aminophenyl) disulfide
bis (4-aminophenyl) disulfide
di(alkylated amino) benzene secondary diamine
bis(alkylated aminophenyl) methane secondary diamine
3,3'-carbomethoxy-4,4'-diamino diphenylmethane
dimethylethylene diamine
diethylethylene diamine
dimethyl propylene diamine
diethyl propylene diamine
pentaethylene hexamine
N,N'-dialkyl-alkylene diamines where the total number of carbon atoms is 20 primary and secondary amine terminated polyether polyols of 100–10,000 molecular weight having 2-6 functionality, preferably from 2 to 3. Commercial products meeting this description include the Jeffamine diamines from Texaco Chemical Co., Houston, Tex. and Polamine 250, Polamine 650 and Polamine 1000 from Air Products and Chemicals, Inc., Allentown, Pa.
hydrazine
ethylene diamine
propylene diamine
butylene diamine hexane diamine
isophorone diamine
dicyclohexylmethane diamine
cyclohexane diamine
pentaethylene hexamine
piperazine
2-methylpentamethylene diamine
1,12-dodecane diamine
bis-hexamethylene diamine and mixtures thereof Difunctional, trifunctional and polymeric amines useful in the curative of this invention include aromatic, aliphatic cycloaliphatic and heterocyclic amines such as piperazine (Texaco, Houston, Tex.) and diamino-dicyclo hexylmethane (PACM20 diamine from Air Products, Allentown, Pa.), dimethylthio toluene diamine (Ethacure 300 diamine, Ethyl Corporation, Baton Rouge, La.), d-tert-butylethylene diamine (DBEDA, Hoechst Celanese, Portsmouth, Va.) menthanediamine (MNDA, Rohm and Haas Company, Philadelphia, Pa.) and dialkylated diamino benzenes such as UNILINK 4100, UNILINK 4102, UNILINK 8100 diamines, dialkylated diaminodiphenylmethanes such as UNILINK 4200 diamine from UOP, inc., Des Plaines, Ill., and the oligomeric products derived from trimethylene glycol di-p aminobenzoate and polytetramethylene ether glycol of MW 250–2000 (Polamine 250, Polamine 650, Polamine 1000 from Air Products). The selection of which amine or combination of diamines to use and their amounts depends on the desired open bondability time and rate of early green strength development for the polyureaurethane adhesive. Generally, from 0.33 to 1.00 equivalent diamine and 0 to 0.67 equivalent polyol can be used in 1.00 equivalent curative. Within these ranges there are various possible proportions as shown in the following list:

| Diamine | Polyol |
| --- | --- |
| 0.35–1.00 | 0 to 0.65 |
| 0.40–1.00 | 0 to 0.60 |
| 0.45–1.00 | 0 to 0.55 |
| 0.50–1.00 | 0 to 0.50 |
| 0.55–1.00 | 0 to 0.45 |
| 0.60–1.00 | 0 to 0.40 |
| 0.65–1.00 | 0 to 0.35 |
| 0.70–1.00 | 0 to 0.30 |
| 0.75–1.00 | 0 to 0.25 |
| 0.80–1.00 | 0 to 0.20 |
| 0.85–1.00 | 0 to 0.15 |

Polyester and polyether polyols may be mixed with the diamines in the curative as another means of controlling the bondability and green strength of the adhesive. When open time of more than 30 minutes is desired the concentration of the polyol is typically more than about 50 equivalent percent. Such polyols should have a functionality of 1.8 to 6.0 and a hydroxyl number from 100 to 1200. A hydroxyl number range of 200 to 700 and a functionality range of 3 to 5 are preferred. Suitable active hydrogen containing materials include diols, triols and tetrols, having primary, secondary and/or tertiary alcohol groups. Among the preferred polyether polyols are: Pluracol PeP 550 polyol, a propoxylated derivative of pentaerythritol having four secondary hydroxyl groups, a hydroxyl number of 450, and a molecular weight of 500 available from BASF Wyandotte Corporation, Parsippany, N.J.; Pluracol P-355 polyol, an ethoxylated/propoxylated derivative of ethylene diamine having about 80% of its hydroxyl groups as primary and having a hydroxyl number of 450, also available from BASF Wyandotte Corporation; Thanol R470X polyol, available from Texaco Chemical Co., Bellaire, Tex., a propoxylated derivative of diethanolamine with a functionality of about 4 and a hydroxy number of 500; Thanol SF-265 polyol, also available from Texaco Chemical Co., a propoxylated derivative of triethanolamine with a functionality of about 3 and a hydroxyl number of 600; Voranol 230–660 polyol, a polyether triol of 85.4 equivalent weight based on the propoxylation of glycerin, available from Dow Chemical Co., Midland, Mich.; and Dianol 2210 polyol, an ethoxylated derivative of bisphenol-A with a functionality of 2 and a hydroxyl number of 280, available from Akzo Chemie America, Chicago, Ill.

The next ingredient of the curative component is an optional catalyst to faciliate the reaction between amines and isocyanates, and between polyols and isocyanates. Suitable tertiary amine catalysts include N, N', N"-dimethylaminopropylhexahydrotriazine (Polycat 41) and 1,4-diazabicyclooctane, and suitable organo metallic catalysts such as those derived from zinc, potassium, bismuth and tin including dibutylin dilaurate, dibutyltin diacetate, ferric acetyl acetonate, nickel acetylacetonate, dibutyltin dialkyl acid, stannous octoate, dibutyltin diiso-octyl mercapto acetate, dibutyl tin diisooctyl maleate, and mixtures of these catalysts. The preferred organo metallic catalyst is the dibutyltin dialkyl acid catalyst known as DABCO 125 catalyst available from Air Products, Allentown, Pa. The preferred tertiary amine catalyst is N, N', N"-dimethylaminopropyl-hexahydrotriazine.

For long open time the preferred catalyst is dibutyltin disulfide, available as Metacure T-5 catalyst from Air Products. The preferred catalysis for curatives containing polyol and piperazine is Dabco 125 (dibutyltin diisooctylmaleate) by itself, or a mixture of Polycat 41 (N, N', N"-dimethylaminopropyl hexahydrotriazine) and DABCO 125. The catalysts when used are generally in quantities of about 0.1% of Polycat 41 catalyst and about 0.04–0.25% of DABCO 125 catalyst by weight based on the weight of the mixed adhesive.

Optional ingredients in the curative include thickening, coloring, odor control agents and drying agents. The preferred optional thickening agents are fumed silica available as Aerosil 200 or Aerosil R972 fumed silica from Degussa Inc., New York, N.Y.; and Hydrite RH thickener, a surface modified kaolinite (hydrated aluminum silicate) from Georgia Kaolin Company, Union, N.J.

Small amounts of other optional materials may also be added to the curative. These include coloring agents, for example, Stantone HCCC. 6783 green coloring agent from Harwick Chemical Company, Akron, Ohio, which is a blend of C. I. Pigment Green #7 and C. I. Pigment Black #7 dispersed in a polyoxypropylene polyol at 17.8 parts of pigment to 82.2 parts polyol. From 1.5 to 3.0 percent of a polyisocyanate such as toluene diisocyanate, 4,4'-methylene diphenyldiisocyanate, or xylylene diisocyanate may also optionally be included in the curative.

It may be desirable to use from 1.0 to 30.0 percent of a drying agent such as a molecular sieve in either the prepolymer or curative (or both). One useful Molecular Sieve moisture scavenger is the 5 Angstrom size available from Union Carbide.

The customer combines the prepolymer blend pack with the curative pack in the desired ratio, usually 3–5 weight parts prepolymer is blended with 1 weight part curative. Polyureaurethane structural adhesives are prepared by mixing the prepolymer with the curative typically using a mix machine Model 200 from EMC$^2$, Sterling Heights, Michigan. The adhesive is applied to the first substrate by conventional means. The second substrate is then laminated over the first adhesive coated substrate. The adhesive is cured either at room temperature or by heating up to 177° C. for 20 minutes. Instead of conventional heat, other energy sources such as microwave, radio frequency or dielectric energy or electromagnetic energy maybe used to cure the adhesive.

The nature and advantage of this invention can be more readily seen and appreciated by reference to the following representative examples, where all reactive components are expressed in equivalents, and the catalysts and non-reacting components in percentages by weight.

EXAMPLE 1

This example describes the preparation of a prepolymer containing Isonate 143L polymerized diphenyl methane diisocyanate as the only polyisocyanate.

Formulation:

| | |
|---|---|
| Polypropylene ether glycol (MW 2000) | 1.00 eq |
| Isonote 143L | 5.50 eq |
| Mistron RCS Talc | 25.0% |
| Molecular Sieves 5A Powder | 5.0% |

Procedure:

To polypropylene ether glycol (PPG 2000) is added Mistron RCS, with adequate agitation to ensure good wetting. The mixture is dehydrated at 100°–105° C., and at a vacuum of less than 1 mm Hg, or until the moisture content is less than 0.05%. Molecular Sieves 5A powder is then added, again with adequate agitation to ensure good wetting. Isonate 143L polyisocyanate is next added, all in one portion. Vacuum is resumed at once, while the mixture reacts at 85°95° C. for an hour, or until the isocyanate content reaches 7.38±0.1%. The final product is discharged at 45°–50° C. and stored under dry nitrogen blanket.

EXAMPLE 2

This example illustrates the preparation of a prepolymer containing a second polyisocyanate.

Table 1 shows the formulations of two examples of prepolymers containing two polyisocyanates. The procedure for their preparation begins the same way as Example 1. After the reaction of Isonate 143L to the theoretical value, Mondur MRS is added at 50°–55° C. The mixture is degassed again while its temperature drops to 45°–50° C. The isocyanate content of the final product is analyzed before the prepolymer is discharged and stored under dry nitrogen blanket.

EXAMPLE 3

This example describes the preparation of the curative of this invention. The diamines are combined with the polyol first, if the latter is present in the formulation. If necessary, heat the mixture below 100° C. while stirring until it is homogeneous. Filler is added with adequate agitation to ensure good wetting, while the temperature drops to 45°–50° C. Molecular Sieves 5A powder is added, again with adequate agitation to ensure good wetting and keeping the temperature at 45°–50° C. Catalyst is then added. After degassing at that temperature in a vacuum of less than 1 mm Hg for about 15 minutes or until foaming subsides, the final product is discharged and stored under a dry nitrogen blanket.

TABLE 1

FORMULATIONS OF PREPOLYMERS CONTAINING TWO POLYISOCYANATES

| | 1483 | 1500 |
|---|---|---|
| PPG 2000, eq | 1.00 | 1.00 |
| Isonate 143L, eq | 5.00 | 5.00 |
| Mondur MRS, eq. | 0.50 | 0.50 |
| Mistron RCS, % | 20.0 | 25.0 |
| Molecular Sieves 5A, % | 5.0 | 5.0 |
| Isocyanate Content, % | 7.93 | 7.43 |

EXAMPLE 4

Table 2 shows examples of three formulations containing only diamines as curatives for the prepolymer in Example 1. These formulations illustrate the blending of aliphatic diamines, piperazine and di-tert-butylethylenediamine (DBEDA), and aromatic diamines di(methylthio) toluene diamine (Ethacure 300 from Ethyl Corporation) and Unilink 4100 to achieve adequate open time and non-sag properties of polyurea structural adhesives. The data in Table 2 also indicate fast development of adhesive strength after fixturing at 163° C. for 45 seconds. Adhesive 1659 developed strength as high as 190 psi for a bondline thickness of 4 mm. In the same test, another commercial adhesive developed a strength of about 80 psi for a bondline thickness of 0.76 mm. When the bondline thickness was 2.0 mm, the commercial adhesive failed to gel. In addition to fast green strength development, the adhesives in Table 2 also showed bondability at 43° C. of about 5 to 10 minutes. Lap shear samples showed extensive substrate delamination at 82° C., as much as samples made from fresh beads of the adhesive. These adhesives also showed extensive and consistent substrate delamination when humidified substrate from a chamber at 32° C./90% RH (relative humidity) was used to prepare lap shear samples. Such excellent adhesion performance was maintained, even when the adhesives did not receive any postbaking at elevated temperatures such as 121° C. for 60 min. In addition to all these advantages, the room temperature cure polyureaurethane adhesives of this invention also demonstrated minimal bondline read-through defect, as commonly tolerated when adhesives requiring postbake at elevated temperatures are used.

EXAMPLE 5

This example demonstrates the synergism between piperazine, N, N', N" dimethylaminopropylhexahydrotriazine (Polycat 41), and dibutyltin dialkyl acid (Dabco 125) in promoting fast cure in an adhesive without sacrificing long open time.

When Dabco 125 in Adhesive 1488 in Table 3 was replaced by more Polycat 41 in Adhesive 1515, the rate of green strength development was significantly retarded. For a bondline thickness of 30 mils, a strength of only 80 psi was developed after fixturing at 163° C. for 45 seconds, as compared with 220 psi for 1488 when both Dabco 125 and Polycat 41 were present.

When a portion of the aromatic diamines in Adhesive 1488 was replaced by a sterically hindered, aliphatic diamine DBEDA, the 43° C. bondability of Adhesive Formulation 1540 did not seem to be influenced by the concentration of Dabco 125 in it. Doubling or tripling the concentration of Dabco 125 as in Adhesives 1551 and 1555 did not shorten the bondability of the adhesives. They were bondable after 12 minutes for Adhesive 1551, and 10 minutes for Adhesive 1555 at 43° C. At the same time, there was a significant increase in the rate of green strength development. However, when Polycat 41 was omitted, as in Adhesive 1552, significantly retarded green strength development was observed. The results in Table 3 demonstrate that synergism between piperazine, Dabco 125, and Polycat 41 provides bondability after 6 to 12 minutes at 43° C., fast green strength development, no sag, and 82° C. adhesion performance with or without postbake, as well as on dry and humidified substrates.

EXAMPLE 6

This example illustrates the use of sterically hindered diamines in the curative formulation of the polyureaurethane adhesive of this invention.

N,N'-Di-butyldiaminobenzene (Unilink 4100), DBEDA, 4,4'-methylenebis(2,6-diethylaniline) (Ethacure 208) and menthane diamine (MNDA) were used to make Curatives 1462, 1486, 1487, and 1490, in Table 4. These curatives were used to cure the prepolymer in Table 1. As the adhesion results in Table 4 indicate, fast green strength development, no sag, and extensive and consistent substrate delamination at 82° C. with or without postbake, as well as on dry and humidified substrates were observed with these adhesives.

TABLE 2

FORMULATIONS OF POLYUREA STRUCTURAL ADHESIVES.

| CURATIVE | 1568 | 1576 | 1658 |
|---|---|---|---|
| Piperazine, eq | 0.150 | 0.150 | 0.200 |
| Ethacure 300, eq | 0.700 | 0.600 | 0.650 |
| DBEDA, eq | — | — | 0.150 |
| Unilink 4100, eq | 0.150 | 0.250 | — |
| Stan Tone 6783, % | 0.50 | 0.50 | 0.50 |
| Mistron RCS, % | 30.0 | 30.0 | 26.0 |
| Aerosil R972, % | — | — | 3.0 |
| Molec Sieves 5A, % | 1.0 | 1.0 | 1.0 |
| Polycat 41, % | 0.40 | 0.40 | 0.40 |
| PROPERTIES*: | 1570 | 1581 | 1659 |
| Mix Ratio, wt | 4.74/1 | 4.62/1 | 5.30/1 |

TABLE 2-continued

FORMULATIONS OF POLYUREA STRUCTURAL ADHESIVES.

| | | | |
|---|---|---|---|
| Open Time, min | 4.5 | 5.5 | 4.5 |
| Button Sag, inch | 0.10 | 0.10 | 0.03 |
| Green Strength: | | | |
| 0.76 mm, psi | 240 | 130 | 170 |
| 2.0 mm, psi | 200 | NG | 250 |
| 4.0 mm, psi | NG | | 190 |
| Lap Shear @ 82° C., psi (% DL): | | | |
| Postbake 1 hr @ °C. | 93 | 98 | 121 |
| Lab 7113 | 350 (99) | 480 (99) | 450 (99) |
| | 340 (99) | 350 (99) | 380 (99) |
| | 320 (99) | 320 (99) | 370 (98) |
| | 280 (99) | 400 (99) | 370 (99) |
| Postbake 1 hr @ °C. | 93 | 98 | 121 |
| 7113 @ 32° C./90% RH | 300 (90) | 370 (99) | 540 (99) |
| | 320 (99) | 340 (99) | 360 (99) |
| | 310 (99) | 320 (99) | 270 (99) |
| | 340 (99) | 380 (99) | 400 (99) |
| Days @ RT Before Test | 6 | 6 | 42** |
| Lab 7113 | 350 (99) | 330 (99) | 480 (90) |
| | 320 (99) | 380 (99) | 420 (99) |
| | 310 (99) | 350 (99) | 410 (99) |
| | 310 (40) | 340 (95) | 480 (99) |
| Bondability: | | | |
| minutes | 5' | 5' | 10' |
| Adhesive @ 43° C. | 230 (99) | 590 (99) | 160 (90) |
| Postbake as above | 210 (99) | 610 (97) | 200 (95) |
| | 210 (99) | 560 (99) | 210 (95) |
| | 170 (96) | 430 (99) | |
| Bondline Read-Through, mils | | | |
| After Postbake (°C./min) | 5.2 (93/60) | 5.8 (93/60) | 8.1 (121/60) |
| No Postbake | 2.0 | 1.1 | 1.8 |

*Prepolymer in Example 1 was cured by these curatives for evaluation.
**Cohesive failure observed when 7-day old samples were tested.

TABLE 3

ADHESIVES BASED ON SYNERGISM BETWEEN PIPERAZINE/POLYCAT 41/DABCO 125

| CURATIVE | 1462 | 1504 | 1537 | 1544 | 1545 | 1546 |
|---|---|---|---|---|---|---|
| PeP 550, eq | 0.300 | 0.300 | 0.300 | 0.300 | 0.300 | 0.300 |
| Piperazine, eq | 0.150 | 0.150 | 0.120 | 0.120 | 0.120 | 0.120 |
| DBEDA, eq | — | — | 0.250 | 0.250 | 0.250 | 0.250 |
| Ethacure 300, eq | 0.350 | 0.350 | 0.180 | 0.180 | 0.180 | 0.180 |
| Unilink 4100, eq | 0.200 | 0.200 | 0.150 | 0.150 | 0.150 | 0.150 |
| Mistron RCS, % | 30.0 | 30.0 | 30 | 30 | 30 | 30 |
| Aerosil 200, % | — | — | 0.37 | 0.75 | 0.75 | 0.75 |
| Molec Sieves 5A, % | 1.0 | 1.0 | 1.0 | 1.0 | 1.0 | 1.0 |
| Dabco 125, % | 0.29 | — | 0.24 | 0.49 | 0.81 | 0.49 |
| Polycat 41, % | 0.40 | 1.0 | 0.40 | 0.40 | 0.40 | — |
| PROPERTIES: | 1488 | 1515 | 1540 | 1551 | 1555 | 1552 |
| Prepolymer | 1483* | 1483* | 1500* | Example 1 Prepolymer | | |
| Mix Ratio, wt | 4.11/1 | 4.53/1 | 4.68/1 | 4.63/1 | 4.65/1 | 4.68/1 |
| Open Time, min | 7.5 | 8 | 7.5 | 7.5 | 4.5 | 7.5 |
| Button Sag, inch | <0.1 | <0.1 | <0.1 | <0.1 | 0.1 | <0.1 |
| Green Strength: | | | | | | |
| 0.76 mm, psi | 220 | 80 | 119 | 127 | 111 | 21 |
| 2.0 mm, psi | −120 | NG | NG | 97 | 84 | NG |
| 4.0 mm, psi | NG | | | NG | NG | |

TABLE 3-continued

ADHESIVES BASED ON SYNERGISM BETWEEN PIPERAZINE/POLYCAT 41/DABCO 125

| Lap Shear @ 82° C., psi (% DL): | | | | | | |
|---|---|---|---|---|---|---|
| Lab 7113 | 420 (99) | 400 (99) | 430 (98) | 530 (99) | 430 (99) | 380 (99) |
| 121° C./1 hr Postbake | 370 (99) | 350 (75) | 430 (99) | 440 (99) | 450 (99) | 390 (99) |
|  | 410 (99) | 330 (99) | 360 (99) | 480 (98) | 340 (99) | 370 (99) |
|  | 420 (99) | 350 (99) | 410 (97) | 480 (99) | 400 (99) | 380 (99) |
| 7113 @ 32° C./90% RH | 330 (99) | 350 (99) | 320 (98) | 380 (99) | 300 (AF) | 320 (60) |
| 121° C./1 hr Postbake | 450 (99) | 350 (99) | 360 (99) | 390 (98) | 380 (90) | 380 (95) |
|  | 460 (99) | 350 (99) | 740 (99) | 430 (98) | 370 (98) | 280 (99) |
|  | 410 (99) | 340 (99) | 370 (99) | 360 (99) | 290 (85) | 310 (99) |
| Days @ RT Before Test | 22 | 9 | 4 | 5 | 4 | 12 |
| Lab 7113 | 370 (99) | 360 (99) | 380 (99) | 350 (50) | 300 (98) | 460 (99) |
|  | 340 (99) | 400 (99) | 370 (99) | 410 (99) | 340 (95) | 400 (99) |
|  | 390 (99) | 430 (99) | 390 (99) | 460 (99) | 370 (95) | 460 (95) |
|  | 370 (99) | 390 (99) | 430 (99) | 470 (99) | 380 (95) | 410 (97) |
| Bondability: minutes | 6 | 7 | 10 | 12 | 10 | 10 |
| Adhesive @ 43° C. | 300 (99) | 480 (99) | 410 (99) | 370 (99) | 430 (99) | 500 (99) |
| 121° C./1 hr Postbake | 310 (99) | 430 (99) | 310 (99) | 430 (99) | 440 (99) | 450 (99) |
|  | 350 (99) | 350 (99) | 350 (99) | 380 (99) | 400 (99) | 430 (98) |
|  | 420 (75) | 410 (99) | 340 (99) | 360 (99) | 400 (99) | 420 (99) |
| Stress-Strain (RT Cure): | | | | | | |
| Sample Age, days | 12 | 9 | 4 | 30 | 8 | 21 |
| Ult Tensile, psi | 2200 | 2300 | 2300 | 2400 | 2300 | 2600 |
| Ult Elongation, % | 31 | 27 | 39 | 37 | 42 | 59 |
| Bondline Read Through, mils | | | | | | |
| After Postbake @ 121° C./60 min | 5.9 | 7.0 | 6.5 | 6.2 | 7.1 | 5.9 |
| No Postbake | 0.7 | 0.7 | 1.3 | 1.2 | 1.2 | 1.6 |

*See Table 1.

TABLE 4

FAST/AMBIENT TEMPERATURE CURE ADHESIVES

| CURATIVE | 1462 | 1486 | 1487 | 1490 |
|---|---|---|---|---|
| DBEDA, eq | — | 0.150 | — | — |
| Piperazine, eq | 0.150 | 0.160 | 0.120 | 0.160 |
| PeP 550, eq | 0.300 | 0.340 | 0.300 | 0.340 |
| MNDA, eq | — | — | — | 0.120 |
| Ethacure 300, eq | 0.350 | 0.350 | 0.430 | 0.380 |
| Ethacure 208, eq | — | — | 0.150 | — |
| Unilink 4100, eq | 0.200 | — | — | — |
| Mistron RCS, % | 30.0 | 30.0 | 30.0 | 30.0 |
| Molec Sieves 5A, % | 1.0 | 1.0 | 1.0 | 1.0 |
| Dabco 125, % | 0.29 | 0.15 | 0.22 | 0.15 |
| Polycat 41, % | 0.40 | 0.40 | 0.40 | 0.40 |
| PROPERTIES: | 1488 | 1507 | 1509 | 1508 |
| Prepolymer in Table 1 | 1483 | 1500 | 1500 | 1500 |
| Mix Ratio, wt | 4.11/1 | 4.69/1 | 4.44/1 | 4.69/1 |
| Open Time, min | 7.5 | 4 | <2 | 5 |
| Button Sag, inch | <0.1 | <0.1 | 0.1 | <0.1 |
| Green Strength: | | | | |
| 0.76 mm, psi | 220 | 220 | 140 | |
| 2.0 mm, psi | −120 | 140 | | 40 |
| 4.0 mm, psi | NG | NG | | NG |
| Lap Shear @82° C., psi (% DL): | | | | |
| Lab 7113 | 420 (99) | 470 (99) | 360 (99) | 390 (99) |
| 121° C./1 hr Postbake | 370 (99) | 370 (99) | 300 (99) | 360 (99) |
|  | 410 (99) | 370 (98) | 220 (99) | 380 (99) |
|  | 420 (99) | 440 (99) | 280 (99) | 480 (99) |
| 7113 @ 32° C./90% RH | 330 (99) | 310 (80) | 300 (99) | 300 (90) |
| 121° C./1 hr Postbake | 450 (99) | 350 (99) | 340 (99) | 280 (99) |
|  | 460 (99) | 380 (99) | 310 (99) | 310 (99) |
|  | 410 (99) | 330 (97) | 320 (99) | 330 (99) |
| Days @ RT Before Test | 22 | 7 | 11 | 10 |
| Lab 7113 | 370 (99) | 390 (95) | 390 (99) | 350 (95) |
|  | 340 (99) | 410 (99) | 410 (99) | 310 (98) |
|  | 390 (99) | 410 (99) | 370 (99) | 330 (97) |
|  | 370 (99) | 450 (99) | 450 (99) | 350 (98) |
| Bondability: | | | | |
| minutes | 6 | 5 | | 5 |
| Adhesive @ 43° C. | 300 (99) | 340 (97) | | 380 (99) |
| 21° C./1 hr Postbake | 310 (99) | 320 (99) | | 340 (99) |
|  | 350 (99) | 350 (99) | | 280 (99) |
|  | 420 (75) | 420 (99) | | 350 (99) |
| Stress-Strain (RT Cure): | | | | |
| Sample Age, days | 12 | 11 | | 11 |
| Ult Tensile, psi | 2200 | 2500 | | 2100 |
| Ult Elong, % | 31 | 25 | | 23 |
| Bondline Read-Through, mils | | | | |
| After Postbake @ 121° C./60 min | 5.9 | 6.5 | 5.5 | 6.4 |
| No Postbake | 0.7 | 1.9 | 1.8 | 1.0 |

EXAMPLE 7

This example illustrates the use of aromatic diamine to achieve primerless adhesion to FRP substrate without postbake. Unilink 4100 dialkylated diamino benzene alone or in combination with Ethacure 300 dimethylthio toluene diamine were added to the PeP 550/piperazine/Dabco 125/

Polycat 41 mixture to make curatives 5130-20 and 5130-24 in Table 5. These curatives were used to cure the prepolymer in Example 1. As the data in Table 5 show delamination of the substrate was observed when the lap shear samples were tested 1, 2, and 6 days after preparation, without the need of postbaking at elevated temperatures. Lap shear strength as high as 70 psi was observed one hour after the preparation of sample 1945. For comparison, in the same test commercial, primer dependent polyurethane adhesive developed strength of 1.5 psi after an hour at room temperature.

EXAMPLE 8

This example illustrates the use of another combination of aliphatic diamine and tin catalyst, other than piperazine and Dabco 125, to achieve long open time for the adhesives of this invention. At the same time, adequate handling strength of these adhesives was obtainable in about an hour of curing at ambient temperature and, after 1, 2, and 5 days at ambient temperatures, extensive delamination of the substrate was observed when the bonded samples were tested.

Diamino-dicyclohexylmethane (PACM 20 from Air Products) in combination with aromatic diamines such as DETDA, Ethacure 300, Unilink 4100, Unilink 4102, or Unilink 4200 was blended with PeP 550 polyol to be catalyzed with dibutyltin disulfide (Metacure T-5 from Air Products). Examples of these curatives are given in Table 6 as 1930, 1940, 1955, 1983, 1994, 2000, and 2001. Open time from 12 to 85 minutes was observed when these curatives were used to cure the prepolymer in Example 1. For Adhesives 1957 and 1960, lap shear strengths of 4.5 and 8 psi, respectively, were observed after an hour of curing at ambient temperature.

EXAMPLE 9

This example shows that a number of aliphatic diamines could be used with Metacure T-5 catalyst to achieve long open time and extensive substrate delamination without postbaking the adhesives. Examples of six curatives are shown in Table 7, illustrating the use of 2-methyl-pentamethylenediamine (Dytek-A from E. I. du Pont de Nemours & Company, Del.), isophoronediamine (IPDA from Huls America, Inc., Chicago, Ill.), 1,2-cyclohexanediamine (1,2-CHDA from du Pont) and piperazine, in combination with PeP 550 polyol and aromatic diamines such as Ethacure 300 and Unilink 4100. Open times of between 14 and 63 minutes were observed when these curatives were used to cure the prepolymer in Example 1. Handling strength of 2 to 3 psi was obtainable with these adhesives after about 2 hrs at ambient temperature. Extensive and consistent substrate delamination was observed as short as after a day of ambient temperature cure when Curative 2023 was used.

TABLE 5

ROOM TEMPERATURE CURING ADHESIVES BASED ON PIPERAZINE/DABCO 125

| CURATIVE | 5130-20 | 24 |
|---|---|---|
| PeP 550, eq | 0.300 | 0.500 |
| Piperazine, eq | 0.070 | 0.070 |
| Ethacure 300, eq | 0.180 | — |
| Unilink 4100, eq | 0.450 | 0.430 |
| Mistron RCS, % | 20.0 | 20.1 |
| Aerosil R972, % | 10.0 | 11.0 |
| Molec Sieves 5A, % | 1.0 | 1.0 |
| Polycat 41, % | 0.40 | 0.40 |
| Dabco 125, % | 0.27 | 0.27 |
| PROPERTIES*: | 1945 | 1951 |
| Mix Ratio, wt | 4.34/1 | 4.14/1 |
| Open Time, min | 7 | 9 |
| Button Sag, inch | 0.22 | 0.19 |
| Green Strength, 1) | 70/1 | 6/1 |
| psi/hrs @ RT 2) | 70/1 | 8/1 |
| Lap Shear @ RT, psi (% DL): | | |
| RT Cure/1 Days | 690 (97) | 530 (98) |
| | 500 (99) | 500 (99) |
| | 700 (98) | 590 (99) |
| | 760 (99) | 630 (99) |
| | 630 (99) | 590 (98) |
| RT Cure/2 Days | 730 (99) | 600 (95) |
| | 550 (99) | 520 (99) |
| | 590 (99) | 550 (40) |
| | 520 (SB) | 540 ( 5) |
| | 400 (35) | 480 (AF) |
| | 500 (10) | |
| RT Cure/6 Days | 610 (15) | 720 (90) |
| | 690 (99) | 540 (99) |
| | 570 (99) | 590 (99) |
| | 520 (99) | 490 (99) |
| | 460 (99) | 510 (99) |
| Stress-Strain (RT Cure): | | |
| Sample Age, days | 14 | 9 |
| Ult Tensile, psi | 2600 | 2700 |
| Ult Elongation, % | 61 | 87 |

*Prepolymer in Example 1 was cured by these curatives for evaluation.

TABLE 6

ROOM TEMPERATURE CURING ADHESIVES BASED ON PACM 20/METACURE T-5

| CURATIVE | 1930 | 1940 | 1955 | 1983 | 1994 | 2000 | 2001 |
|---|---|---|---|---|---|---|---|
| PeP 550, eq | 0.500 | 0.580 | 0.730 | 0.530 | 0.727 | 0.730 | 0.830 |
| PACM 20, eq | 0.080 | 0.080 | 0.070 | 0.070 | 0.070 | 0.070 | 0.070 |
| Ethacure 300, eq | 0.150 | 0.150 | — | — | — | — | 0.100 |
| Unilink 4100, eq | 0.270 | — | 0.200 | 0.400 | 0.179 | 0.100 | — |
| Unilink 4102, eq | — | 0.200 | — | — | — | — | — |
| DETDA, eq | — | — | — | — | 0.024 | — | — |
| Unilink 4200. eq | — | — | — | — | — | 0.100 | — |
| Mistron RCS, % | 22.0 | 22.0 | 20.0 | 20.0 | 20.0 | 20.0 | 20.0 |
| Aerosil R972, % | 8.0 | 8.0 | 9.0 | 10.0 | 9.0 | 10.0 | 6.0 |
| Molec Sieves 5A, | 1.0 | 1.0 | 1.0 | 1.0 | 1.0 | 1.0 | 1.0 |
| Metacure T-5, % | 0.070 | 0.070 | 0.070 | 0.070 | 0.068 | 0.20 | 0.20 |
| PROPERTIES*: | 1957 | 1960 | 1964 | 1992 | 1997 | 2005 | 2013 |
| Mix Ratio, wt | 4.05/1 | 4.04/1 | 3.94/1 | 3.95/1 | 3.99/1 | 3.83/1 | 4.17/1 |
| Open Time, min | 12 | 12 | 70–85 | 13 | 58 | 50 | 38 |

TABLE 6-continued

ROOM TEMPERATURE CURING ADHESIVES BASED ON PACM 20/METACURE T-5

| | | | | | | | |
|---|---|---|---|---|---|---|---|
| Button Sag, inch | 0.19 | 0.40 | 0.21 | 0.17 | 0.11 | 0.15 | 0.23 |
| Green Strength, 1) | 4.5/1 | 8/1 | 1.5/3 | 7/4 | 9/5 | 5/3 | 7/2 |
| psi/hrs @ RT 2) | | 16/2.5 | 7.4/5 | 14/5 | 27/6 | 51/5 | 19/3 |
| 3) | | | 52/8 | 30/6 | 95/5 | 130/6 | 42/4 |
| Lap Shear @ RT, psi (% DL): | | | | | | | |
| Lab 7113 | 570 (98) | 530 (CF) | 640 (25) | 600 (40) | 530 (25) | 600 (95) | 500 (99) |
| RT Cure/1 Day | 630 (98) | 500 (CF) | 580 (80) | 600 (97) | 570 (80) | 550 (99) | 470 (99) |
| | 510 (99) | 470 (CF) | 650 (70) | 580 (80) | 570 (80) | 520 (85) | 520 (99) |
| | 540 (30) | 460 (CF) | 580 (70) | 550 (95) | 420 (AF) | 490 (10) | 500 (90) |
| Lab 7113 | 510 (99) | | 770 (95) | 470 (99) | 570 (75) | 570 (80) | 640 (99) |
| RT Cure/2 Days | 480 (99) | | 760 (90) | 500 (98) | 560 (70) | 660 (98) | 670 (98) |
| | 530 (99) | | 750 (98) | 490 (98) | 660 (60) | 610 (99) | 580 (99) |
| | 580 (99) | | 630 (99) | 550 (30) | 570 (70) | 640 (98) | 640 (75) |
| Lab 7113 | 500 (98) | 480 (99) | 490 (99) | 440 (95) | 670 (30) | 520 (99) | 500 (99) |
| RT Cure/5 Days | 630 (99) | 600 (99) | 630 (99) | 510 (97) | 720 (99) | 450 (95) | 600 (99) |
| | 580 (99) | 550 (99) | 740 (97) | 550 (95) | 700 (99) | 490 (95) | 460 (99) |
| | 590 (80) | 550 (97) | 630 (99) | 510 (99) | 650 (99) | 520 (98) | 420 (99) |
| Lap Shear @ 82° C., psi (% DL): | | | | | | | |
| Lab 7113 | 560 (98) | 510 (99) | 380 (99) | 530 (98) | 320 (10) | 420 (90) | 430 (97) |
| 121° C./1 hr Postbake | 500 (99) | 480 (98) | 400 (97) | 480 (99) | 380 (95) | 420 (95) | 460 (98) |
| | 470 (99) | 410 (99) | 410 (99) | 530 (99) | 430 (99) | 390 (99) | 430 (99) |
| | 470 (99) | 440 (99) | 450 (25) | 370 (99) | 400 (95) | 410 (65) | 430 (99) |
| Stress-Strain (RT Cure): | | | | | | | |
| Sample Age, days | 18 | 17 | 11 | 12 | 17 | 12 | 12 |
| Ult Tensile, psi | 2000 | 1700 | 2200 | 2300 | 2100 | 2000 | 2000 |
| Ult Elong, % | 26 | 27 | 43 | 57 | 41 | 36 | 32 |

*Prepolymer in Example 1 was cured by these curatives for evaluation.

TABLE 7

OTHER ALIPHATIC DIAMINES FOR ADHESIVES WITH OR WITHOUT POSTBAKE

| CURATIVE | 1989 | 1999 | 2021 | 1984 | 2012 | 2023 |
|---|---|---|---|---|---|---|
| PeP 550, eq | 0.580 | 0.730 | 0.630 | 0.730 | 0.50 | 0.630 |
| Dytek A, eq | 0.080 | 0.070 | 0.070 | — | — | — |
| IPDA, eq | — | — | — | 0.070 | — | — |
| 1,2-CHDA, eq | — | — | — | — | 0.50 | — |
| Piperazine, eq | — | — | — | — | — | 0.070 |
| Ethacure 300, eq | 0.100 | — | — | — | — | — |
| Unilink 4100, eq | 0.240 | 0.200 | 0.300 | 0.200 | 0.400 | 0.300 |
| Mistron RCS, % | 22.0 | 20.0 | 20.0 | 20.0 | 20.0 | 20.0 |
| Aerosil R972, % | 8.0 | 10.0 | 11.0 | 9.0 | 10.0 | 10.0 |
| Molec Sieves 5A, % | 1.0 | 1.0 | 1.0 | 1.0 | 1.0 | 1.0 |
| Metacure T-5, % | 0.070 | 0.20 | 0.25 | 0.070 | 0.15 | 0.30 |
| PROPERTIES*; | 1959 | 2004 | 2026 | 1993 | 2016 | 2028 |
| Mix Ratio, wt | 4.14/1 | 4.02/1 | 4.12/1 | 3.96/1 | 4.14/1 | 4.16/1 |
| Open Time, min | 14 | 63 | 25 | 63 | 21 | 23 |
| Button Sag, inch | 0.15 | 0.13 | 0.15 | 0.19 | 0.32 | 0.10 |
| Green Strength, psi/hrs @ RT 1) | 28/4 | 15/4 | | 2/3 | 3/2 | 2/2 |
| 2) | 31/5 | 29/5 | | 4/4 | 9/3 | 11/4 |
| 3) | | 134/6 | | | | |
| Lap Shear @ RT, psi (% DL): | | | | | | |
| Lab 7113 | 500 (99) | 540 (30) | 600 (90) | 430 (15) | 450 (10) | 560 (99) |
| RT Cure/1 day | 560 (98) | 620 (80) | 530 (00) | 510 (40) | 550 (10) | 580 (99) |
| | 620 (75) | 610 (70) | 620 (99) | 450 (15) | 570 (20) | 580 (99) |
| | 480 (70) | 550 (35) | 600 (80) | 440 (7) | 520 (AF) | 600 (95) |
| Lab 7113 | 600 (50) | 550 (90) | 540 (99) | 540 (97) | 630 (70) | |
| RT Cure/2 Days | 600 (99) | 590 (99) | 560 (65) | 620 (99) | 640 (99) | |
| | 560 (95) | 700 (99) | 530 (60) | 620 (80) | 550 (99) | |
| | 610 (65) | 640 (99) | 550 (5) | 630 (99) | 590 (97) | |
| Lab 7113 | 540 (99) | 600 (98) | 530 (99) | 570 (60) | 670 (99) | 600 (99) |
| RT Cure/5 Days | 540 (99) | 550 (99) | 510 (99) | 660 (99) | 630 (99) | 670 (99) |
| | 530 (99) | 600 (99) | 640 (99) | 700 (99) | 560 (99) | 720 (99) |

TABLE 7-continued

OTHER ALIPHATIC DIAMINES FOR ADHESIVES
WITH OR WITHOUT POSTBAKE

|  | 550 (99) | 590 (60) | 590 (50) | 570 (75) | 610 (99) | 650 (99) |
|---|---|---|---|---|---|---|
| Lap Shear @ 82° C., psi (% DL): | | | | | | |
| Lab 7113 | 520 (98) | 390 (90) | 490 (99) | 410 (65) | 550 (99) | 430 (99) |
| 121° C./ | 460 (93) | 480 (99) | 460 (99) | 470 (90) | 580 (99) | 550 (97) |
| 1 hr Postbake | 530 (95) | 460 (90) | 510 (97) | 380 (98) | 570 (99) | 510 (98) |
|  | 510 (99) | 520 (99) | 410 (99) | 370 (30) | 580 (99) | 560 (98) |
| Stress-Strain (RT Cure): | | | | | | |
| Sample Age, days | 17 | 13 | 11 | 14 | 11 | 7 |
| Ult Tensile, psi | 2200 | 2700 | 2800 | 2800 | 2900 | 2400 |
| Ult Elongation, % | 40 | 66 | 55 | 79 | 89 | 66 |

*Prepolymer in Example 1 was cured by these curatives for evaluation.

EXAMPLE 10

This example illustrates how a polyureaurethane adhesive of this invention may be cured by dielectric energy. Adhesive 1719 in Table 8 was cured by dielectric energy provided by the WorkRite unit in the laboratory. The energy strength and length of exposure time of 340 milliamperes (mA)/45 seconds and 280 mN60 sec were preferred. Extensive and consistent substrate delamination at 82° C. was observed after dielectric energy cure.

EXAMPLE 11

This example illustrates the applicability of the polyureaurethane adhesives of this invention to different FRP substrates. The adhesion performance of these adhesives on GenCorp's 7113 and 7098 laminates is presented in Table 9. Delamination of the substrates at 82° C. was extensive and consistent, whether the substrate was from ambient conditions or preconditioned for more than 24 hours in a humidity chamber at 32° C. and 90% relative humidity. Furthermore, such excellent adhesion performance at 82° C. was also maintained, even though the postbake step of the adhesive bonding preparation was delayed 5 days or more.

The data in the table also demonstrate the rapid development of the green strength of the polyureaurethane adhesives of this invention. Heating the adhesive bondline on one side only of an 0.125 inch thick FRP at 135° C.–149° C. for 2 minutes 44 seconds was sufficient to produce enough handling strength, for example, for an automotive body part. Rapid development of green strength was also demonstrated for adhesive bondline thickness as much as 6.0 mm.

EXAMPLE 12

This example illustrates the use of combinations of diamines of high and low molecular weights to achieve longer open time for a polyureaurethane structural adhesive of this invention. The formulations in Table 10 show the use of a polymeric aromatic diamine of about 870 molecular weight, POLAMINE 650, in combination with UNILINK 4100 to provide open time as long as 9 min. Furthermore, these examples illustrate the flexbility of the polyureaurethane adhesives with ultimate elongation values of 140–180% after room temperature cure. Substantial delamination of FRP substrate at 25° C. as well as 82° C. was demonstrated with or without postbake.

TABLE 8

DIELECTRIC ENERGY CURING OF
POLYUREAURETHANE ADHESIVE 1719

| Prepolymer: Curative 1718: | Example 1 | |
|---|---|---|
| Pep 550 | 0.30 eq | |
| Piperazine | 0.12 eq | |
| Ethacure 300 | 0.18 eq | |
| Unilink 4100 | 0.15 eq | |
| DBEDA | 0.25 | |
| StanTone 6783 | 0.49% | |
| Mistron RCS | 19% | |
| Aerosil R972 | 6.8% | |
| Molec Sieves 5A | 1.0% | |
| Polycat 41 | 0.4% | |
| Daber 125 | 1.4% | |
| Dielectric | Lap Shear @ 82° C. (Lab 7113) | |
| Energy Milliamperes/Seconds | Age @ RT | psi (Failure Mode) |
| 340/45 | 22.5 hr | 450 (75% DL) |
|  |  | 440 (85% DL) |
|  |  | 400 (95% DL) |
|  |  | 360 (60% DL) |
| 280/60 | 22.5 hr | 390 (90% CF/AF) |
|  |  | 440 (75% DL) |
|  |  | 480 (97% DL) |
|  |  | 420 (90% DL) |
| 280/60 | 2 days | 380 (75% DL) |
|  |  | 350 (90% DL) |
|  |  | 380 (90% DL) |
|  |  | 340 (95% DL) |
| 280/60 | 3 days | 440 (85% DL) |
|  |  | 430 (95% DL) |
|  |  | 420 (95% DL) |
|  |  | 340 (95% DL) |

TABLE 9

RAPID GREEN STRENGTH DEVELOPMENT AND SUBSTRATE VARIETY TOLERANCE OF POLYUREAURETHANE STRUCTURAL ADHESIVES

| CURATIVE | 2223 | 2284 | 2336 | 2215 | 2301 | 2337 |
|---|---|---|---|---|---|---|
| PeP 550, eq | 0.630 | 0.620 | 0.620 | 0.630 | 0.610 | 0.630 |
| Piperazine, eq | 0.070 | 0.080 | 0.080 | — | — | — |
| Dytek-A, eq | — | — | — | 0.700 | 0.70 | 0.070 |
| Ethacure 300, eq | 0.300 | 0.300 | 0.300 | 0.300 | 0.300 | 0.300 |
| Mistron RCS, % | 18.0 | 18.0 | 20.0 | 20.0 | 20.0 | 20.0 |
| Aerosil R972, % | 3.0 | 6.0 | 5.0 | 7.0 | 8.0 | 7.0 |
| Molecular Sieves 5A, % | 1.0 | 1.0 | 1.0 | 1.0 | 1.0 | 1.0 |
| Metacure T-5, % | 0.60 | 1.0 | 0.80 | 0.40 | 0.55 | 0.80 |
| PROPERTIES:** | 2233 | 2289 | 2342 | 2238 | 2308 | 2343 |
| Mix Ratio, wt | 4.65/1 | 4.44/1 | 4.35/1 | 4.17/1 | 4.19/1 | 4.17/1 |
| Open Time, min | 5 | 4 | 5 | 5 | 4.5 | 5 |
| Button Sag, inch | 0.43 | 0.14 | 0.18 | 0.17 | 0.21 | 0.23 |
| Green Strengths[a], psi (RT/150° C. Fixt) | | | | | | |
| 2.0 mm | 200 | — | — | 160 | — | — |
| 3.0 mm | 130 | — | 20 | — | — | — |
| 4.0 mm | 3 | 12 | 1 | 3 | 4 | 20 |
| 5.0 mm | — | — | — | — | — | soft |
| Green Strength, psi (RT/135° C. Fixt) | | | | | | |
| 30 mils | 270 | — | — | — | — | — |
| 2.0 mm | 150 | — | — | — | — | — |
| 3.0 mm | 120 | — | 11 | — | — | — |
| 4.0 mm | 40 | 14 | 1 | — | 4 | 9 |
| 5.0 mm | NG | — | | — | — | soft |
| 6.0 mm | | 2 | — | — | — | |
| Lap Shear @ 82° C., psi (% DL): | | | | | | |
| Lab 7113 | 410 (98) | 430 (99) | 420 (99) | 470 (99) | 540 (97) | 460 (98) |
| 121° C./1 hr Postbake | 420 (99) | 460 (98) | 470 (99) | 480 (99) | 590 (99) | 490 (99) |
| | 470 (99) | 470 (99) | 520 (99) | 440 (99) | 540 (99) | 500 (99) |
| | 500 (98) | 460 (99) | 480 (98) | 480 (99) | 600 (99) | 490 (95) |
| 7113 @ 32° C./90% RH | 420 (95) | 490 (98) | 530 (98) | 470 (98) | 440 (98) | 470 (80) |
| 121° C./1 hr Postbake | 490 (95) | 460 (97) | 480 (99) | 440 (99) | 450 (98) | 450 (98) |
| | 450 (99) | 450 (98) | 480 (99) | 460 (98) | 450 (98) | 420 (99) |
| | 390 (95) | 410 (98) | 450 (75) | 400 (98) | 410 (99) | 420 (99) |
| Lab 7113 | 460 (55) | 410 (98) | 450 (98) | 450 (97) | 500 (98) | 480 (80) |
| 121° C./1 hr Postbake @ | 480 (97) | 460 (99) | 520 (99) | 430 (99) | 380 (99) | 410 (99) |
| after 3–4 days @ RT | 470 (93) | 530 (95) | 470 (98) | 560 (98) | 410 (99) | 410 (93) |
| | 500 (65) | 450 (AF) | 490 (97) | 510 (99) | 480 (98) | 440 (97) |
| Lab 7113 | 450 (20) | 420 (90) | 440 (99) | 400 (90) | 490 (50) | 480 (98) |
| 121° C./1 hr Postbake @ | 490 (97) | 420 (98) | 440 (99) | 410 (99) | 520 (98) | 450 (70) |
| after 5–7 days @ RT | 460 (98) | 390 (98) | 420 (99) | 410 (98) | 500 (98) | 420 (95) |
| | 450 (96) | 410 (AF) | 450 (98) | 440 (98) | 480 (98) | 470 (90) |
| Lab 7098/7098 | 720 (97) | 380 (LB) | 680 (95) | 760 (95) | 460 (50)# | 600 (99) |
| 121° C./1 hr Postbake | 800 (90) | 400 (95) | 550 (60)# | 830 (98) | 440 (99) | 820 (90) |
| | 740 (97) | 390 (96) | 600 (90)# | 900 (99) | 460 (99) | 740 (97) |
| | 680 (70) | 410 (LB) | 770 (60)# | 880 (96) | 350 (LB) | 640 (99) |
| 7098 @ 32° C./90% RH | 410 (99) | 400 (95) | 430 (75) | 470 (99) | 480 (95) | 430 (97) |
| ° C./1 hr Postbake | 470 (99) | 320 (98) | 430 (05) | 480 (99) | 340 (LB) | 500 (98) |
| | 420 (99) | 350 (80) | 400 (05) | 500 (99) | 510 (96) | 420 (90) |
| | 480 (40) | 360 (LB) | 430 (07) | 380 (99) | 430 (95) | 550 (97) |
| Stress-Strain: (121° C./1 hr Postbake) | | | | | | |
| Ult Tensile, psi | | 2400 | 2600 | 2100 | 2400 | |
| Ult Elongation, % | | 29 | 37 | 20 | 42 | |

**Curatives were evaluated by curing Prepolymer in Example 1.
Substrate broke before finishing 100% DL.
[a]Green strength was measured after heating only one side of a lap shear sample at 135° C. or 150° C. for 2 minutes and 44 seconds plus 20 seconds of cooling before testing. The procedure was repeated for lap shear samples of bondline thicknesses of 2.0 mm to 6.0 mm.

TABLE 10

RT Cure Polyureaurethane Structural Adhesives with Substrate Delamination at RT and 1800F.

| Curative | 2579 | 2600 |
|---|---|---|
| Dytek-A, eq | 0.050 | 0.060 |
| Ethacure 300, eq | 0.200 | 0.300 |
| Unilink 4100, eq | 0.550 | 0.440 |
| Polamine 650, eq | 0.200 | 0.200 |
| Mistron RCS, % | 10.0 | 9.0 |
| Aerosil R972, % | 4.0 | 4.0 |
| Molecular Sieves 5A, % | 1.0 | 1.0 |
| Bismuth Catalyst Coscat 83*, % | 0.35 | 0.70 |

| Property** | 2598 | 2605 |
|---|---|---|
| Mix Ratio, wt | 3.36/1 | 3.47/1 |
| Open Time, min | 9 | 4 |
| Button Sag, inch | 0.61 | 0.40 |
| Lap Shear @ RT; psi (% DL): | | |
| Lab 7113/7113 | 2d @ RT | 4d @ RT |
| No Postbake | 620 (50) | 640 (15) |
|  | 560 (98) | 640 (96) |
|  | 550 (100) | 630 (98) |
|  | 550 (40) | 690 (96) |
| Lab 7113/7113 | 3d @ RT |  |
| No Postbake | 470 (90) |  |
|  | 560 (90) |  |
|  | 500 (85) |  |
|  | 430 (30) |  |
| Lap Shear @ 82° C., psi (% DL): | | |

| Curative | 2579 | 2600 |
|---|---|---|
| Lab 7113/7113 | +3d @ RT | +4d @ RT |
| Postbake @ 121° C./1 hr | 500 (100) | 620 (96) |
|  | 480 (100) | 610 (98) |
|  | 500 (100) | 620 (100) |
|  | 480 (100) | 540 (98) |
| Lab 7113/7113 | +3d @ RT | +4d @ RT |
| Postbake @ 71° C./20 min | 510 (75) | 560 (95) |
|  | 430 (95) | 630 (98) |
|  | 570 (75) | 570 (98) |
|  | 370 (80) | 610 (96) |
| Lab 7113/7113 | 3d @ RT | 4d @ RT |
| No Postbake | 470 (90) | 450 (5) |
|  | 560 (90) | 500 (95) |
|  | 500 (85) | 470 (98) |
|  | 430 (30) | 480 (98) |
| Stress-Strain: (Postbake @ 121° C./1 hr) | | |
| Ultimate Tensile, psi | 3320 | 2960 |
| Ultimate Elongation, % Stress-Strain/RT | 170 | 120 |

TABLE 10-continued

RT Cure Polyureaurethane Structural Adhesives with Substrate Delamination at RT and 1800F.

| Cure: | | |
|---|---|---|
| Sample Age, days | 11 | 8 |
| Ultimate Tensile, psi | 3430 | 3080 |
| Ultimate Elongation, % | 180 | 140 |

*Available from Cosan Chemical Corporation, Carlstadt, New Jersey.
**Curatives were evaluated by curing Prepolymer in Example 1.

I claim:

1. The method of making a laminate of a first untreated fiberglass reinforced polyester substrate and a second substrate selected from an untreated fiberglass reinforced polyester substrate and an untreated metal substrate, said first and second substrates adhered together with the dried residue of a polyureaurethane structural adhesive having up to 180 percent elongation comprising the steps of:

applying to said first substrate an adhesive composition consisting essentially of the mixture of a. an isocyanate terminated prepolymer component prepared by reacting an excess of slowly reacting polyisocyanate mixture of 85 parts diphenyl methane—4,4'diisocyanate monomer and 15 parts uretonimine oligomer, and a polyol, and b. a curative component comprising from 0.45 to 1.00 equivalents of an amine of less than 2315 molecular weight selected from the group of:
1-methyl-3,5-diethyl-2,6-diaminobenzene,
di(methylthio) toluene diamine,
isophorone diamine,
dicyclohexylmethane diamine,
piperazine,
2-methylpentamethylene diamine,
dialkylated diamino benzene,
dialkylated diamino diphenylmethane,
di-p-aminobenzoate, MW 250–2000, of trimethylene glycol or polytetramethylene ether glycol or
di-tertiary-butylethylene diamine, and
0 to 0.55 equivalents polyol per 1.00 equivalent curative, permitting such adhesive coated substrate to wait until further treatment up to as long as 85 minutes open time, said adhesive sagging less than 0.61 inch during said open time, affixing said second substrate, permitting said affixed substrates to wait unheated for as long as 72 hours, and curing said affixed substrates at room temperature or by postbaking at temperatures up to 177° C., whereby said fiberglass reinforced polyester substrate has a defect-free outer surface and a lap shear strength of 400 pounds per square inch measured at 82° C. is attained.

* * * * *